United States Patent Office 3,484,740
Patented Dec. 16, 1969

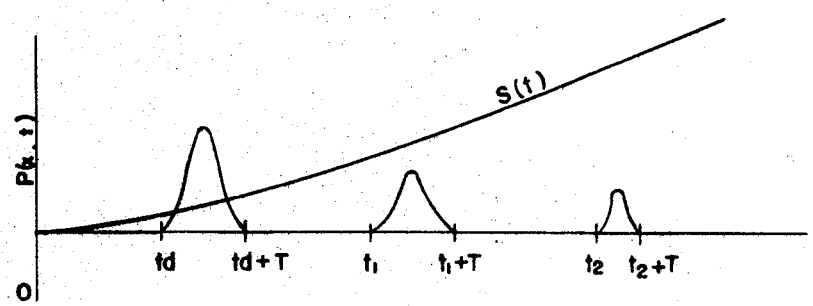
FIG. 2
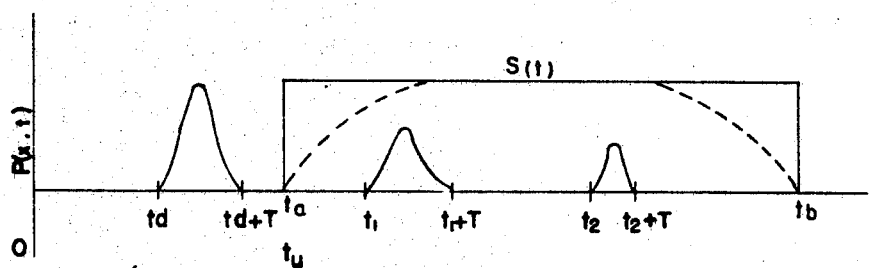
FIG. 3
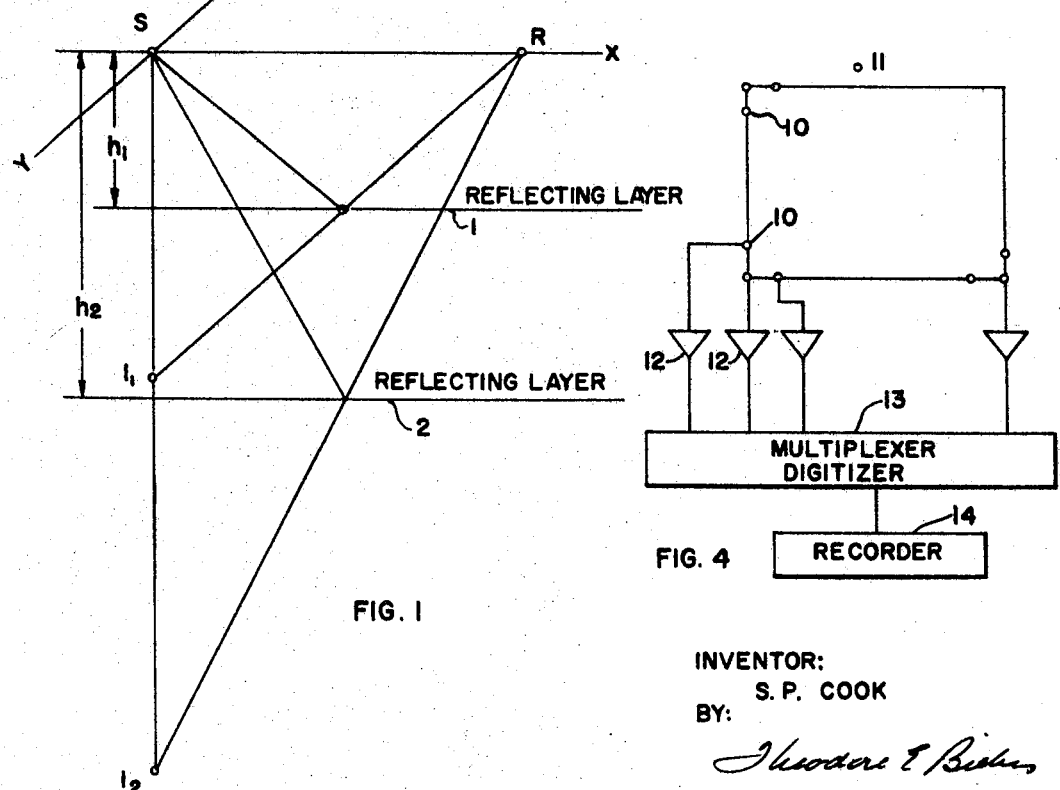
FIG. 1
FIG. 4
INVENTOR:
S. P. COOK
BY:
*Theodore E. Bieber*
HIS ATTORNEY

3,484,740
PRODUCING ACOUSTIC HOLOGRAMS
Samuel P. Cook, Irving, Tex., assignor to Shell Oil Company, New York, N.Y., a corporation of Delaware
Filed Dec. 7, 1967, Ser. No. 688,920
Int. Cl. G01r 1/28
U.S. Cl. 340—15.5      4 Claims

ABSTRACT OF THE DISCLOSURE

A method for forming a three-dimensional display of seismic data utilizing conventional seismic methods. The conventional seismic data is used to produce by Fourier analysis an analysis signal relating to the amplitude and phase of a selected frequency. The analysis signal is mixed with a coherent signal of the same frequency and a constant phase to produce a summation signal. The summation signal is rectified and then displayed in an areal display at a position corresponding to the receiving seismometer to create a holographic record of the seismic data.

BACKGROUND OF THE INVENTION

The invention relates to a method and apparatus for forming an acoustic or seismic hologram of reflecting surfaces as described in a copending application of N. D. Smith, Jr., entitled "Holographic Seismic Exploration," Ser. No. 659,084, filed Aug. 8, 1967.

As explained in the copending application, current methods of seismic exploration use an explosion or elastic disturbance that is initiated at a point or points near the surface of the earth to generate seismic waves that travel through the earth. The resulting reflected or diffracted seismic waves are recorded as a function of time at a number of points on the surface. The data is then displayed as a time-distance plot in the form of a variable-area, variable-density, single-line wiggle recording. These displays of the recorded signals present them projected onto a plane normal to the surface through the surface line of observation points as a function of time. Frequently, it is possible to select wave fronts of suitable curvature to form an interpretive model of the reflecting surfaces on the basis of the geometrical optics for a once-reflected compressional wave.

While at times it is possible to interpret the data, a major problem of interpretation arises when one attempts to select a meaningful wave front from the mass of data recorded. Various filtering techniques have been resorted to to enhance the wave fronts of interest, while minimizing the unwanted wave fronts and noise. Major improvements in filtering have been made by digitizing the recorded data and digitally processing the data based on communication theory. While the digital processing has improved the interpretation of the data, it is still directed to the selection of wave fronts that can be used in a geometrical optical model in two dimensions. No attempts have been made to present the seismic data in three dimensions and no method of using wave optics has been developed. Thus, the interpretation still depends on the basic premise that the original elastic disturbance is only once-reflected from a surface and the geometrical optical model can be constructed by locating the resulting signal in the seismic data.

It is obvious that the once-reflected theory of seismic exploration is not entirely accurate. An elastic disturbance is not reflected as a single ray from a reflecting surface, but rather a multitude of rays having various phases. In view of the multiple waves reflected from a single reflecting surface, it is obvious that seismic processing systems based on a theory of a single ray reflection from a surface will have serious limitations. The problem is especially difficult in the case of deep reflecting surfaces that result in relatively weak signals and thus seriously limit the information that can be obtained from the survey.

SUMMARY OF THE INVENTION

The present invention solves the above problems by generating an acoustic or seismic hologram of the reflecting surfaces. The seismic hologram is converted to a scaled optical hologram that when viewed in coherent visible light will construct a scaled optical image corresponding to the original acoustic images of the acoustic source in any reflecting surface located within the acoustically sampled earth. Thus, a single-point reflector would appear as a bright point in the scaled optical image a scaled distance from the surface of the sampled volume. Similarly, if the sampled volume contained a single perfectly reflecting interface and there were no reflections from the surface of the earth, the reconstructed image from the hologram would contain a single image of the source. Similarly, a series of parallel planes will appear as a sequence of multiple images located within the sample volume.

In the process of the present invention, acoustic waves are generated near the surface of the earth, and waves that are reflected and/or refracted from subterranean structures are received at an areal array of receiving stations. Seismic receiver signals that are so obtained are Fourier analyzed to provide analysis-derived signals relating to the amplitude and phase distributions of acoustic waves of a selected frequency. In respect to each receiving station location, the analysis-derived signal is mixed with a reference signal that has the same frequency and has a phase that is related to the relative positions of the wave generating and receiving stations. The intensities of the mixed signals are displayed, in locations related to the receiving station locations, in a visible display adapted to diffract coherent light. The displayed signals do not have to be directly proportional to the intensity (i.e., proportional to the average squares of the amplitudes), but may be a more complicated function of the signal amplitudes without seriously distorting the holographic image that can be produced. Such a visible display is an optical hologram corresponding to a seismic hologram that would form along the plane of the areal array of receivers.

The seismic receiver signals are preferably digitally recorded and digitally processed. The processing preferably includes weathering corrections and the like, procedures for improving the signal-to-noise ratio without altering the amplitude and phase distribution of the acoustic waves that are diffracted from subterranean structures.

The recorded signals of the above type can be converted to an optical hologram by various means. For example, the recorded signals can be first placed in the desired sequence and then supplied to a cathode ray oscilloscope circuit. The cathode ray oscilloscope screen can be divided into areas corresponding to the location and distribution of the original receiving locations and the beam-brightening or Z-axis of the scope can be modulated by the signal from the particular receiving location. This will result in the display on the front of the oscilloscope corresponding to an optical hologram analogous to the seismic hologram as it would appear in an array of receiving locations. The display will contain information of the phase and amplitude of the original received waves. Information on the face of the oscilloscope can be recorded by a suitable photographic means to produce a photographic record, such as a transparency or a replica of the seismic hologram. Holographic transparency can then be converted into a visual image using the same techniques that are used with optical holograms. For example, the transparency may be illuminated with coherent monochromatic light, as for example, from a laser beam, and the resulting optical images will be a visual optical display of the original acoustic images of the acoustic source in the reflecting surfaces and other discontinuities within the acoustically sampled portion of the earth.

DESCRIPTION OF THE DRAWINGS

The above advantages of this invention and its operation will be more easily understood from the following detailed description when taken in conjunction with the attached drawings in which:

FIGURE 1 is a simplified illustration of the method of the invention;

FIGURE 2 is a waveform showing the received signals along a horizontal time axis and a reference signal;

FIGURE 3 is a duplication of FIGURE 2 with a modified reference signal; and

FIGURE 4 is a simplified diagram for an apparatus suitable for carrying out the method of this invention.

DESCRIPTION OF A PREFERRED EMBODIMENT

The proposed process of the present invention can be more easily understood by first considering a very simplified model of an earth volume that is to be surveyed by the process of this invention. In FIGURE 1 it is assumed that a space is filled with a fluid having a constant velocity of the propagation of acoustical pressure waves. The $x$–$y$ plane in this space is selected a distance $h_1$ above and parallel to a reflecting plane 1 and $h_2$ above a second reflecting parallel plane 2. The reflection coefficient of the reflecting planes is small so that multiple reflections can be ignored in the following consideration. A source point is chosen at the origin of the right hand coordinate system and a seismometer receiving point is disposed in the $x$–$y$ plane at a point $r$, which, for simplicity, is located along the $x$-axis. The pressure disturbance is initiated at a source point. This disturbance, reduced in amplitude, will arrive at the seismometer R after a time $t_d = x/v$ by means of a direct path, and a second disturbance will arrive by means of the reflector 1 at a time $$t_1 = \frac{\sqrt{(2h_1)^2 + x^2}}{v} \quad (1)$$

and a third disturbance by means of the reflector 2 at a time $$t_2 = \frac{\sqrt{(2h_2)^2 + x^2}}{v} \quad (2)$$

The above travel times are the same as those that would be observed if the disturbance originated simultaneously at a source of the direct wave at the image $I_1$ of the reflector 1 and to the image $I_2$ of the reflector 2. The amplitude of the signals decreases with the distance traveled and in addition the reflected waves will be reduced by the reflection coefficient of the reflecting layers. Thus, the signal reaching the second reflector will be reduced by the amount reflected by the first reflector, although the effect due to the energy reflected can be neglected if the reflection coefficient is small.

If one now assumes that the quantity $p(x_1,t)$ is a pressure amplitude at the receiving point R as a function of time and that the source point is excited by a pressure wave having a form $Ag(t)$ having a value in the interval of zero to T and zero at all other values, one can write the following equation:

$$p(x,t) = \frac{A}{x}g(t-t_d) + \frac{K_1 A}{\sqrt{(2h_1)^2 + x^2}}g\left(t - \frac{\sqrt{(2h_1)^2 + x^2}}{v}\right) + \frac{K_2 A}{\sqrt{(2h_2)^2 + x^2}}g\left(t - \frac{\sqrt{(2h_2)^2 + x^2}}{v}\right) \quad (3)$$

It is well known that an arbitrary function of time as shown in Equation 3 can be expanded in a Fourier integral in a continuous spectrum of harmonic waves of varying amplitude and phase. These relationships are expressed mathematically by a Fourier transform pair as follows:

$$g(t) = \int_{-\infty}^{+\infty} G(f) e^{+2\pi j f t} df \quad (4)$$

$$G(f) = \int_{-\infty}^{+\infty} g(\tau) e^{-2\pi j f \tau} d\tau \quad (5)$$

Thus, the time function $p(x,t)$ can be expressed in the frequency domain as $$P(x,f) = \frac{A}{x}\int_{-\infty}^{+\infty} g(\tau - t_d) e^{-2\pi j f \tau} d\tau + \frac{K_1 A}{\sqrt{(2h_1)^2 + x^2}} \int_{-\infty}^{+\infty} g(\tau - t_1) e^{-2\pi j f \tau} d\tau + \frac{K_2 A}{\sqrt{(2h_2)^2 + x^2}} \int_{-\infty}^{+\infty} g(\tau - t_2) e^{-2\pi j f \tau} d\tau \quad (6)$$

If one assumes $q = \tau - t_d$, then $dq = d\tau$ and $\tau = q + t_d$. Substituting these in Equation 6 one obtains $$P(x,f) = A \left[ \frac{e^{-2\pi j f t_d}}{x} + \frac{K_1 e^{-2\pi j f t_1}}{\sqrt{(2h_1)^2 + x^2}} + \frac{K_2 e^{-2\pi j f t_2}}{\sqrt{(2h_2)^2 + x^2}} \right] \int_{-\infty}^{+\infty} g(q) e^{-2\pi j f q} dq \quad (7)$$

From an inspection of Equation 7 it is seen that the integral of $$g(q) e^{-2\pi j f q} \text{ is } G(f) \quad (8)$$

of the initial pulse. Further, $$G(f) = |G(f)| e^{-j\phi(f)} \quad (9)$$

wherein the magnitude of the complex function $G(f)$ and the phase of the function for the frequency $f$ is $\phi(f)$. Thus, Equation 7 can be reduced to $$P(x,f) = A \left[ \frac{e^{-2\pi j f(t_d + \phi)}}{x} + \frac{K_1 e^{-2\pi j f(t_1 + \phi)}}{\sqrt{(2h_1)^2 + x^2}} + \frac{K_2 e^{-2\pi f(t_2 + \phi)}}{\sqrt{(2h_2)^2 + x^2}} \right] |G(f)| \quad (10)$$

Equation 10 can be further reduced by amking the following substitutions:

$\alpha = 2\pi f(t_d + \phi)$
$\beta = 2\pi f(t_1 + \phi)$
$\gamma = 2\pi f(t_2 + \phi)$
$a = 1/x$ $$b = \frac{K_1}{\sqrt{(2h_1)^2 + x^2}}$$

$$c = \frac{K_2}{\sqrt{(2h_2)^2 + x^2}}$$

Then $$P(x,f) = [ae^{-j\alpha} + be^{-j\beta} + ce^{-j\gamma}] A |G(f)|$$

and then by substituting $U = a \cos \alpha + b \cos \beta + c \cos \gamma$
$V = a \sin \alpha + b \cos \beta + c \sin \gamma$ $$\psi = \tan^{-1} \frac{V}{U}$$

Equation 10 reduces to $$P(x,f) = A |G(f)| \sqrt{U^2 + V^2} e^{-j\psi} \quad (11)$$

Now if one assumes that a continuous source of frequency $f_1$ is placed at the origin and at each of the two image points $I_1$ and $I_2$, then the amplitude of the sinusoidal wave is $A|G(f_1)|$ and the phase is $\phi(f_1)$. The pressure due to these sources at R is given by $$p(x,t) = \frac{A}{X}|G(f_1)|\sin 2\pi(t-t_d-\phi) + \frac{A|G(f)|K_1}{\sqrt{(2h_1)^2+x^2}}\sin 2\pi f(t-t_1-\phi) + \frac{A|G(f_1)|K_2}{\sqrt{(2h_2)^2+x^2}}\sin 2\pi f(t-t_2-\phi)$$
(12)

The above equation using the format set forth above can be reduced to $$p(x,t) = A|G(f_1)|\sqrt{U^2+V^2}\sin(2\pi ft-\psi) \quad (13)$$

Now if one assumes that the amplitude at the frequency $f_1$ and the phase $\psi(f_1)$ from Equation 11 generates a sine wave at the receiving location R, it will be given by the equation $$p(x,t) = |P(x,f_1)|\sin(2\pi ft-\psi) = A|G(f_1)|\sqrt{U^2+V^2}\sin(2\pi ft-\psi)$$
(14)

From inspection it is seen that Equation 14 is identical with Equation 13, and thus a continuous source of frequency $f_1$ and phase $\psi(f_1)$ at the origin will be equivalent to using the amplitude and phase of $f_1$ derived from the Fourier transform of the time domain records made with a broad band pulse at the origin. Consequently, combining either value with a reference wave and squaring will give a signal having the elements of a seismic hologram at the receiving location R. If one repeats the procedure for various points in the $x$–$y$ plane, a seismic hologram can be constructed.

FIGURE 2 shows schematically the term $p(x,t)$ which is zero except from the intervals between $t_d$ to $t_d+t$; $t_1$ to $t_1+t$; and $t_2$ to $t_2+t$. Also shown in FIGURE 2 is a function $s(t)$. Consider the function $p_a(x,t) = s(t)p(x,t)$. The Fourier transform of $p_a(x,t)$, $p_a(x,f)$, can be written and reduced to the following form:

$$P_a(x,f) = \int_{-\infty}^{+\infty} s(\tau)g(\tau-t_d)e^{-2\pi if\tau}d\tau + b\int_{-\infty}^{+\infty} s(\tau)g(\tau-t_1)e^{-2\pi if\tau}d\tau + c\int_{-\infty}^{+\infty} s(\tau)g(\tau-t_2)e^{-2\pi if\tau}d\tau$$
(15)

Since the term $g(t)$ has been defined for the interval O to T and O elsewhere, the limits of integration of Equation 16 can be changed to finite limits of $t_d$ to $t_d+t$ and $t_1$ to $t_1+t$ and $t_2$ to $t_2+t$, respectively. Since $s(t)$ is a slowly varying function of $t$, and since $t$ is a small time interval, the term $s(t)$ can be replaced by its average value over the range of each integral, and thus (15) would be reduced to $$P_a(x,f) = a\frac{s(t_d+\tau)}{2} + s(t_d)\int_{t_d}^{t_d+\tau} g(\tau-t_d)e^{-2\pi if\tau}d\tau + b\frac{s(t_d+\tau)+s(t_d)}{2}\int_{t_1}^{t_1+\tau} g(\tau-t_1)e^{-2\pi if\tau}d\tau + c\frac{s(t_d+\tau)+s(t_d)}{2}\int_{t_2}^{t_2+\tau} g(\tau-t_2)e^{-2\pi if\tau}d\tau$$
(16)

Thus, in effect, the relative amplitudes of the images have been changed by assuming the average value of the slowly varying function $s(t)$ in place of the original pressure response received at the receiving location R. The hologram constructed from the term $P_a(x,f)$ will have different intensities for the images, but their location will be the same as if the original pressure waves received at the receiving location were used. Thus, a programmed or automatic gain control amplifier can be used to record the signals received at the location R and reduce the required dynamic range of the recording system.

In FIGURE 3 the term $s(t)$ is shown as a constant in the interval between $t_a$ to $t_b$ and zero elsewhere. Thus, the first integral of Equation 16 will become zero and the resulting terms will represent a situation where the direct wave is eliminated from the subsequent hologram. This has the effect of choosing a time interval over which to compute the Fourier transform that removes the shallower and deeper images from the hologram. Of course, in an actual case, there will be a large number of travel paths from the source to the receiving location R and hence $p_a(x,t)$ will not be zero in an interval of $t$ greater than $t_d$. Consequently, the term $s(t)$ should be tapered as shown in FIGURE 3 by the dotted lines.

While the above discussion has been directed to an extremely simplified model, it is easily appreciated that the same principles will also apply in the case of a complicated elastic solid such as the earth. In addition to the simply reflected compressional waves, there will be multiple reflected and refracted waves plus transverse waves and a multitude of interrelated waves arriving at the receiving location R. While the various complex waves will be arriving at the receiving location, the invention can be applied as described above to the complex waves.

The operation of the invention in an actual survey can be more easily understood by reference to FIGURE 4 which shows schematically an areal array of seismometers 10. Each of the seismometers in the array is connected to one of a set of automatic gain controlled amplifiers 12 and band pass filters. The shot point is located at a point 11 to one side of the seismometer array. The output of the amplifiers is sampled, digitized and multiplexed by a conventional digital recording system 13 and then recorded on magnetic tape by a recorder 14.

The spacing of the seismometers is determined by the shallowest layer to be studied and the frequency of the seismic source while the areal extent of the array is determined by the desired resolving power. For example, the spacing between the seismometers may be on the order of 50–100 feet and the array may be a square array ¼ to ½ mile on a side. While the system is shown using a single source of seismic waves and the resulting signals recorded at all the seismometers simultaneously, if the source can be reproduced accurately, then only a portion of the receivers need be recorded for each of a plurality of shots. After the seismometer signals are recorded, the tape can be transferred to a digital processing system where the various corrections can be applied. For example, in general the elevation of the seismometers and the thickness of the low velocity surface layer will vary between the seismometer locations. It will be necessary to correct the data to a common datum plane and for the time delays in the surface layer.

After the data is time corrected it can be Fourier analyzed by a suitable program on a digital computer for a selected time interval. This analysis will result in a frequency and phase distribution for each seismometer location, which can then be combined for the desired frequency to construct a hologram. The hologram can be constructed by summing the sine wave having the amplitude and phase of the chosen frequency with a reference sine wave of the same frequency and a phase related to the position of the shot and to the location of the seismometer in question. For example, a plane reference wave striking the array normally would result in a constant phase of reference wave for each seismometer. The sum for each seismometer is then squared and the average value recorded for the particular seismometer. The data can be recorded on magnetic tape in such a manner that it can be played back onto the face of a cathode ray tube with the z-axis producing the intensity proportional to the average square of the wave at the seismometer. Similarly, the $x$ and $y$ sweep can be controlled so that the presentation places the data for each seismometer in a geometrically similar position to the position of the seismometer occupied in the original array.

The display on the front of the cathode ray oscilloscope may be converted to a transparency by photographing or similar processes. The transparency can then be illuminated with coherent light to reconstruct an optical image analogous to the acoustical image producing the original seismic hologram. This process of converting the recorded signals into an optical image is more particularly described in the above-referenced copending application.

I claim as my invention:

1. A process of seismic exploration comprising:
   propagating broad band, substantially noncoherent acoustic energy from a surface source to a subsurface structure and back to the surface;
   receiving at one of an areal array of receiver locations at the surface said propagated acoustic energy and producing a reception signal related to the received acoustic energy;
   producing, by Fourier transform of the reception signal over a selected time interval, a transform-derived signal relating to the amplitude and phase of a selected frequency;
   mixing the derived signal with a coherent signal of the selected frequency to produce a summation signal;
   displaying a visible indication of a time average of the square of each summation signal in a position related to that of the receiving location in the array of receiving locations; and
   diffracting coherent light from the pattern of visible indications and holographically displaying an image related to the subsurface structure from which acoustic energy was returned.

2. The process of claim 1 in which each derived signal is mixed with a coherent signal that has the selected frequency and has a phase adjusted to the extent required to compensate for the distance between the locations at which the waves are produced and received.

3. The process of claim 2 in which the broad band energy source is a point impulse source.

4. The process of claim 2 in which the broad band energy source is a wave source with frequency varying with time and the reception signal is related to the energy that is received.

References Cited

UNITED STATES PATENTS 3,400,363  9/1968  Silverman _____ 340—3
3,292,143  12/1966  Russell _____ 340—15.5

RODNEY D. BENNETT, JR., Primary Examiner

C. E. WANDS, Assistant Examiner

U.S. Cl. X.R.

350—3.5